US012180387B2

(12) United States Patent
Greszta-Franz et al.

(10) Patent No.: US 12,180,387 B2
(45) Date of Patent: Dec. 31, 2024

(54) COATING COMPOSITION

(71) Applicant: Covestro Intellectual Property GmbH & Co. KG, Leverkusen (DE)

(72) Inventors: Dorota Greszta-Franz, Solingen (DE); Jianping Shen, Shanghai (CN); Junchao Zheng, Shanghai (CN); Yifeng Xu, Shanghai (CN); Ling Yang, Shanghai (CN); Jinqi Li, Shanghai (CN); Hongchao Li, Shanghai (CN); Hao Liu, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 703 days.

(21) Appl. No.: 17/258,487

(22) PCT Filed: Jul. 17, 2019

(86) PCT No.: PCT/EP2019/069232
§ 371 (c)(1),
(2) Date: Jan. 7, 2021

(87) PCT Pub. No.: WO2020/016292
PCT Pub. Date: Jan. 23, 2020

(65) Prior Publication Data
US 2021/0277277 A1 Sep. 9, 2021

(30) Foreign Application Priority Data

Jul. 20, 2018 (CN) .......................... 201810809380.1
Sep. 24, 2018 (EP) ..................................... 18196219

(51) Int. Cl.
C09D 175/12 (2006.01)
C08G 18/10 (2006.01)
C08G 18/32 (2006.01)
C08G 18/38 (2006.01)
C08G 18/50 (2006.01)
C08G 18/72 (2006.01)
C08G 18/73 (2006.01)
C08G 18/76 (2006.01)
C08G 18/78 (2006.01)
C08G 18/79 (2006.01)

(52) U.S. Cl.
CPC .......... *C09D 175/12* (2013.01); *C08G 18/10* (2013.01); *C08G 18/3253* (2013.01); *C08G 18/3256* (2013.01); *C08G 18/3821* (2013.01); *C08G 18/5021* (2013.01); *C08G 18/721* (2013.01); *C08G 18/73* (2013.01); *C08G 18/7657* (2013.01); *C08G 18/7831* (2013.01); *C08G 18/79* (2013.01)

(58) Field of Classification Search
CPC .............. C09D 175/12; C08G 18/3253; C08G 18/3256; C08G 18/3821
See application file for complete search history.

(56) References Cited

U.S. PATENT DOCUMENTS

| 3,428,610 | A | 2/1969 | Klebert |
| 5,126,170 | A | 6/1992 | Zwiener et al. |
| 5,236,741 | A | 8/1993 | Zwiener et al. |
| 5,243,012 | A * | 9/1993 | Wicks ................ C08G 18/3821 528/68 |
| 5,489,704 | A | 2/1996 | Squiller et al. |
| 5,736,604 | A | 4/1998 | Luthra |
| 6,458,293 | B1 | 10/2002 | Roesler et al. |
| 7,196,154 | B2 * | 3/2007 | Bonilla ................ C09D 175/12 528/68 |
| 7,927,704 | B2 | 4/2011 | Mager et al. |
| 2002/0123593 | A1 | 9/2002 | Milhem |
| 2002/0132934 | A1 | 9/2002 | Huynh-Ba |
| 2004/0063894 | A1 * | 4/2004 | Danielmeier ........ C08G 18/792 528/272 |
| 2004/0067315 | A1 | 4/2004 | Niesten et al. |

(Continued)

FOREIGN PATENT DOCUMENTS

| CA | 2316536 A1 * | 8/2000 | ............. C08G 18/10 |
| CN | 103834282 A | 6/2014 | |
| CN | 105199573 A | 12/2015 | |
| CN | 106147560 A | 11/2016 | |
| CN | 107556893 A | 1/2018 | |
| CN | 108129637 A | 6/2018 | |
| EP | 3098247 A1 | 11/2016 | |
| EP | 3115388 A1 | 1/2017 | |
| WO | 2006066031 A1 | 6/2006 | |

OTHER PUBLICATIONS

Product Data Sheet_Desmodur XP2580_Feb. 23, 2016.*
International Search Report, PCT/EP2019/069232, date of mailing: Aug. 23, 2019, Authorized officer. Stephane Bezard.

*Primary Examiner* — Michael L Leonard
(74) *Attorney, Agent, or Firm* — Richard P. Bender; Jed C. Benson

(57) ABSTRACT

The present invention relates to a coating composition, a coating method and use of the composition, and a product coated with the coating composition. The coating composition comprises: (a) an isocyanate-reactive component comprising: (a1) at least one polyaspartic ester, and (a2) optionally a polyetheraspartic ester; (b) an isocyanate component comprising: (b1) at least one isocyanate prepolymer having an isocyanate group equivalent of 300 to 1100, and (b2) at least one isocyanate oligomer containing not less than two isocyanate groups, the weight ratio of the isocyanate prepolymer (b1) to the isocyanate oligomer (b2) being from 1:4 to 4:1; (c) a catalyst; and (d) optionally an additive; wherein the coating composition has a molar ratio of isocyanate groups to isocyanate-reactive groups of 1.5:1 to 8:1. The coating composition provided by the present invention has a long pot life, and the resulting coating has the advantages of fast drying and high hardness.

20 Claims, No Drawings

(56) References Cited

U.S. PATENT DOCUMENTS

| | | |
|---|---|---|
| 2005/0106395 A1 | 5/2005 | Asher |
| 2006/0247371 A1 | 11/2006 | Mundstock et al. |
| 2011/0294934 A1 | 12/2011 | Wamprecht et al. |
| 2016/0024339 A1* | 1/2016 | Squiller ............ C08G 18/3821 524/589 |
| 2017/0298171 A1* | 10/2017 | Johnston ............ C08G 18/7671 |

* cited by examiner

COATING COMPOSITION

CROSS-REFERENCE TO RELATED APPLICATION

This application is a national stage application under 35 U.S.C. § 371 of PCT/EP2019/069232, filed Jul. 17, 2019, which claims the benefit of European Application No. 18196219.2, filed Sep. 24, 2018, and Chinese Application No. 201810809380.1, filed Jul. 20, 2018, each of which is incorporated herein by reference.

TECHNICAL FIELD

The present invention relates to a coating composition, a coating method and use of the coating composition, and a product coated using the coating composition.

BACKGROUND

The two-component coating containing an aspartic ester is widely used because of its advantages of weather resistance, abrasion resistance, heat and humidity resistance, and salt spray resistance, as well as its ability to meet high solids level, low viscosity and environmental protection requirements, especially as a floor paint.

EP0573860B discloses a two-component coating comprising a polyisocyanate, an isocyanate-reactive component and a catalyst, wherein the equivalent ratio of isocyanate groups to isocyanate-reactive groups is from 0.8:1 to 20:1.

US2004067315A discloses a two-component coating comprising an isocyanate group-containing prepolymer and an isocyanate-reactive component.

CN103834282A discloses a weather-resistant and anti-corrosive polyurea coating consisting of a component A and a component B, wherein the component A consists of an aliphatic polyisocyanate trimer and xylene, the component B consists of a modified dimeric aspartic ester polyurea resin, a dispersant, a leveling agent, an antifoaming agent, an anti-settling agent, an organic bentonite, a pigment, a filler, a matting agent, xylene and propylene glycol methyl ether acetate, and the weight ratio of the component A to the component B is 1:4.

The above two-component coatings have a short pot life and can only be applied by using special spraying equipments, which increase the cost and difficulty of application.

The current methods for extending the pot life are mainly as follows: 1) a large amount of reactive diluents or solvents are added to the coating formulation to reduce the viscosity growth rate of the coating, thereby ensuring a sufficient pot life. However, many reactive diluents (such as vinylene carbonate) have a certain degree of toxicity, and the addition of a large amount of reactive diluents or solvents may cause additional environmental pollution, which does not meet the trend and requirements of environmental protection (see, for example, CN106147560A). 2) Isocyanates having low activity, such as macromolecular prepolymers, are used to reduce the reactivity, so as to ensure that the coating has a sufficient pot life. However, the low-activity macromolecular prepolymers generally have a high viscosity, which not only increases the difficulty of application, but also slows the drying rate of the coating. It results in that the coating formed has a low hardness, and the coating surface cannot be completely dried even for a long period (see, for example, US20040067315A, CN102300894, U.S. Pat. No. 3,428,610, WO2007/039133). Therefore, the low-activity isocyanates are only suitable for some applications in the field of elastomers or waterproof coatings. 3) Isocyanate-reactive components having low activity are used. Although the use of such products can extend the pot life, the drying time of the coating is also greatly prolonged, and thereby cannot meet the requirements of industrial applications in terms of the drying time.

Therefore, it is desirable to develop a coating composition having a long pot life, which forms a coating having the advantages of fast drying and high hardness.

SUMMARY OF THE INVENTION

It is an object of the present invention to provide a coating composition, a coating method and use of the coating composition, and a product coated with the coating composition.

The coating composition according to the present invention comprises:
(a) an isocyanate-reactive component comprising:
   (a1) at least one polyaspartic ester, and
   (a2) optionally a polyetheraspartic ester;
(b) an isocyanate component comprising:
   (b1) at least one isocyanate prepolymer having an isocyanate group equivalent of 300 to 1100, and
   (b2) at least one isocyanate oligomer containing not less than two isocyanate groups, the weight ratio of the isocyanate prepolymer (b1) to the isocyanate oligomer (b2) being from 1:4 to 4:1;
(c) a catalyst; and
(d) optionally an additive;
wherein the coating composition has a molar ratio of isocyanate groups to isocyanate-reactive groups of 1.5:1 to 8:1.

According to one aspect of the invention, there is provided the use of the coating composition according to the present invention for protecting a substrate surface or a coating thereof.

According to another aspect of the invention, there is provided a coating method comprising the steps of applying the coating composition provided according to the present invention to a substrate surface, followed by curing and drying.

According to another aspect of the invention, there is provided a coated product comprising a substrate and a coating formed by applying the coating composition provided according to the present invention to the substrate and then curing and drying.

The coating composition of the present invention has a long pot life, and the coating formed by the composition has the advantages of fast drying and high hardness.

DETAILED DESCRIPTION

The present invention provides a coating composition comprising:
(a) an isocyanate-reactive component comprising:
   (a1) at least one polyaspartic ester, and
   (a2) optionally a polyetheraspartic ester;
(b) an isocyanate component comprising:
   (b1) at least one isocyanate prepolymer having an isocyanate group equivalent of 300 to 1100, and
   (b2) at least one isocyanate oligomer containing not less than two isocyanate groups, the weight ratio of the isocyanate prepolymer (b1) to the isocyanate oligomer (b2) being from 1:4 to 4:1;
c) a catalyst; and
d) optionally an additive;

wherein the coating composition has a molar ratio of isocyanate groups to isocyanate-reactive groups of 1.5:1 to 8:1.

The present invention also provides a coating method and use of the coating composition, and a product coated with the coating composition.

Coating Composition

The organic group described herein that does not react with or is inert to an isocyanate group refers to that having no Zerevitinov-active hydrogen. Zerevitinov-active hydrogen is defined in Rompp's Chemical Dictionary (Rommp Chemie Lexikon), 10th ed., Georg Thieme Verlag Stuttgart, 1996. Generally, groups with Zerevitinov-active hydrogen include, but are not limited to hydroxyl, amino, and thiol groups.

The coating composition described herein may comprise a two-component coating composition. The term "two-component" refers to a coating composition comprising at least two components that must be stored in separate containers because of their mutual reactivity. When the two separate components are mixed and applied on a substrate, the mutually reactive compounds in the two components react to crosslink and form a cured coating.

The term "curing and drying" as used herein refers to the progression of a liquid coating composition from the liquid state to a cured state.

The term "each independently" as used herein means that the identity of R may be the same or different.

The composition has a molar ratio of isocyanate groups to isocyanate-reactive groups of preferably 1.5:1 to 4:1, most preferably 1.9:1 to 2.5:1.

The isocyanate-reactive groups may be hydroxyl, thiol, and amino groups, most preferably secondary amino groups.

The coating composition preferably has an organic solvent content of less than 60 g/L.

Isocyanate-Reactive Component (a)

Polyaspartic Ester (a1)

As used herein, the term "polyamine" refers to compounds comprising at least two free primary and/or secondary amino groups. Polyamines include polymers comprising at least two pendant and/or terminal amino groups.

The polyaspartic ester is obtained by the Michael addition reaction of a system comprising a polyamine and an ester.

The ester is preferably one or more of the following: a maleate and a fumarate.

The reaction for preparing the polyaspartic ester can be carried out without any solvent or in the presence of a suitable solvent.

The solvent is preferably one or more of the following: an alcohol, an ether, an acetate, and a ketone.

The alcohol is preferably one or more of the following: methanol, ethanol, butyl glycol, and propanol.

The acetate is preferably n-butyl acetate.

The ketone is preferably methyl ethyl ketone dialkane.

The polyaspartic ester (a1) preferably comprises a polyaspartic ester according to formula I:

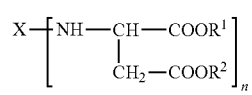

I wherein

X represents an aliphatic residue, $R^1$ and $R^2$ are each independently an organic group that is inert to an isocyanate group at normal pressure and at 100° C. or less, n is an integer of not less than 2.

The $R^1$ and $R^2$ are each independently preferably an alkyl residue having 1 to 10 carbon atoms, and most preferably one or more of the following: methyl, ethyl, and butyl.

The n is preferably an integer of 2 to 4, most preferably 2.

The aliphatic residue herein is preferably obtained from an alcohol compound, which is preferably one or more of the following: ethylene glycol, 1,2-dihydroxypropane, 1,4-dihydroxybutane 1,6-dihydroxyhexane, 2,2,4- and/or 2,4,4-trimethyl-1,6-dihydroxyhexane, 1-hydroxy-3,3,5-trimethyl-5-hydroxymethylcyclohexane, 4,4'-dihydroxydicyclohexylmethane, 3,3'-dimethyl-4',4'-dihydroxydicyclohexylmethane, 1,5-dihydroxy-2-methylpentane, 1,1,1-trimethylolpropane and 2,2-bis(hydroxymethyl)-1,3-propanediol (pentaerythritol).

The aliphatic residue of the polyaspartic ester is preferably one or more of the following: a linear alkyl residue, a branched alkyl residue, and a cycloalkyl residue, most preferably a cycloalkyl residue.

The polyaspartic ester preferably has a content of more than 50 wt %, based on the total weight of the isocyanate-reactive component (a).

The polyaspartic ester most preferably has a content of 65 to 100 wt %, based on the total weight of the isocyanate-reactive component (a).

The polyaspartic ester preferably has an amino group equivalent of 200 to 500.

The polyaspartic ester preferably has a viscosity of 500-4000 mPa s.

When n is 2, the polyaspartic ester is prepared by a reaction comprising a polyamine of the following formula and a maleate and/or a fumarate of the following formula:

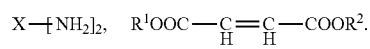

The polyamine is preferably one or more of the following: ethylenediamine, 1,2-diaminopropane, 1,4-diaminobutane, 1,3-diaminopentane, 1,6-diaminohexane, 2,5-diamino-2,5-dimethylhexane, 2,2,4-trimethyl-1,6-diaminohexane, 2,4,4-trimethyl-1,6-diaminohexane, 1,11-diaminoundecane, 1,12-diaminododecane, 1,3-cyclohexanediamine and 1,4-cyclohexanediamine, amino-3,3,5-trimethyl-5-aminomethylcyclohexane, 2,4-hexahydrotoluenediamine, 2,6-hexahydrotoluenediamine, 2,4'-diamino-dicyclohexylmethane, 4,4'-diamino-dicyclohexylmethane, 3,3'-dialkyl-4,4'-diaminodicyclohexylmethane, 2,4,4'-triamino-5-methyl-dicyclohexylmethane, 2-methyl-1,5-pentanediamine, 1,3-xylenediamine and 1,4-xylenediamine; further preferably one or more of the following: 1,4-aminobutane, 1,6-diaminohexane, 2,2,4-trimethyl-1,6-diaminohexane, 2,4,4-trimethyl-1,6-diaminohexane, amino-3,3,5-trimethyl-5-aminomethylcyclohexane, 4,4'-diamino-dicyclohexylmethane, 3,3'-dialkyl-4,4'-diaminodicyclohexylmethane and 2-methyl-1,5-pentanediamine; most preferably one or more of the following: 2-methyl-1,5-pentanediamine, amino-3,3,5-trimethyl-5-aminomethylcyclohexane, 2,4'-diamino-dicyclohexylmethane, 4,4'-diamino-dicyclohexylmethane and 3,3'-dialkyl-4,4'-diaminodicyclohexylmethane.

The maleate and/or fumarate are preferably one or more of the following: dimethyl maleate, diethyl maleate, dibutyl maleate, dimethyl fumarate, diethyl fumarate, and dibutyl fumarate.

The temperature of the reaction is preferably from 0° C. to 100° C.

The weight ratio of the maleate and/or fumarate to the polyamine is preferably 2:1.

The weight ratio of the olefinic double bonds of the maleate and/or fumarate to the primary amino groups of the polyamine is preferably 1:1.

The product obtained from the reaction is preferably purified by distillation.

The components of the reaction may or may not comprise a solvent, and preferably comprise a solvent.

The solvent is preferably one or more of the following: methanol, ethanol, propanol, and dioxane.

The polyaspartic ester (a1) preferably comprises one or more of the following polyaspartic esters:

(i) a polyaspartic ester having the structure of formula II,

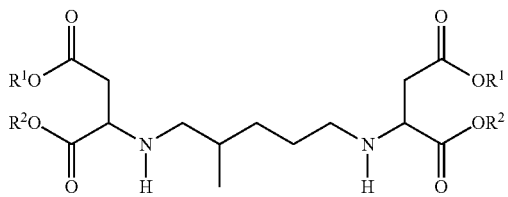

II (ii) a polyaspartic ester having the structure of formula III, and

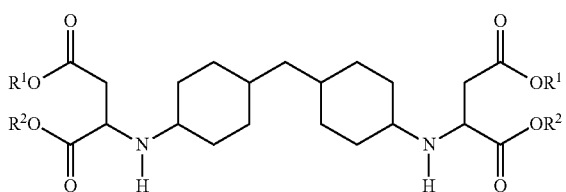

III (iii) a polyaspartic ester having the structure of formula IV,

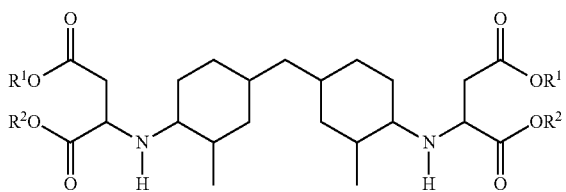

IV wherein $R^1$ and $R^2$ are each independently one or more of the following: methyl, ethyl, and butyl.

The $R^1$ and $R^2$ are each independently most preferably ethyl.

The polyaspartic ester is most preferably one or more of the following: the isocyanate-reactive components as described in US512617, US523674, U.S. Pat. Nos. 5,489, 704, 5,243,012, 5,736,604, 6,458,293, 6,833,424, 7,169,876 or US2006/0247371, Desmophen NH1220, Desmophen NH1420, Desmophen NH1520, and Desmophen NH1521.

Polyetheraspartic ester (a2)

The polyetheraspartic ester preferably has a content of less than 35 wt %, based on the total weight of the isocyanate-reactive component.

The polyetheraspartic ester most preferably has a content of 10 to 35 wt %, based on the total weight of the isocyanate-reactive component.

The polyetheraspartic ester preferably has an amino group equivalent of 200 to 500.

The polyetheraspartic ester preferably has a viscosity of 50 to 2000 mPa s.

The polyetheraspartic ester (a2) preferably comprises a polyetheraspartic ester according to formula V:

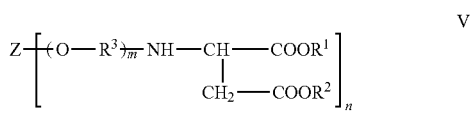

V wherein

Z represents an aliphatic residue, $R^1$ and $R^2$ are each independently an organic group that is inert to an isocyanate group at normal pressure and at 100° C. or less, $R^3$ represents a $C_1$-$C_6$ alkyl residue, n is an integer of not less than 2, m is an integer of 1 to 5.

The $R^1$ and $R^2$ are each independently preferably an alkyl residue having 1 to 10 carbon atoms, and most preferably one or more of the following: methyl, ethyl, and butyl.

The aliphatic residue of the polyetheraspartic ester is preferably one or more of the following: a linear alkyl residue, a branched alkyl residue, and a cycloalkyl residue.

The polyetheraspartic ester is preferably obtained by the Michael addition reaction of a system comprising a polyetheramine and a dialkyl maleate.

The polyetheraspartic ester is further preferably obtained by a reaction comprising a polyether polyamine of the following formula and a maleate and/or a fumarate of the following formula:

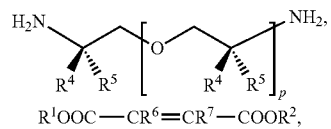

$R^1OOC—CR^6=CR^7—COOR^2$, wherein p is an integer of not less than 2, further preferably 2 to 35, more preferably 2 to 8, and most preferably 2.5 to 6.1, $R^1$ and $R^2$ are each independently an organic group that is inert to an isocyanate group at normal pressure and at 100° C. or less, $R^4$ and $R^5$ are each independently one or more of the following: hydrogen and a $C_1$-$C_4$ alkyl residue, $R^6$ and $R^7$ are each independently one or more of the following: hydrogen and an organic group inert to an isocyanate group.

The $R^1$ and $R^2$ are each independently preferably an alkyl residue having 1 to 10 carbon atoms, and most preferably one or more of the following: methyl, ethyl, and butyl.

The $R^4$ and $R^5$ are each independently most preferably one or more of the following: hydrogen and methyl.

The $R^6$ and $R^7$ are each independently preferably hydrogen.

The number-average molecular weight of the polyether polyamine is preferably from 100 g/mol to 1000 g/mol, most preferably from 148 g/mol to 600 g/mol.

The polyether polyamine is preferably an aliphatic polyether polyamine containing primary amino groups, such as Jeffamine polyether polyamine, available from Huntsman Corporation, The Woodlands, Tex.

The polyether polyamine is preferably a mixture of a polyether polyamine having a mean p value of 2.5 and a polyether polyamine having a mean p value of 6.1.

The polyether polyamine having a mean p value of 2.5 has a content of 50 to 99 wt %, preferably 50 to 90 wt %, and most preferably 80 to 90 wt %, based on the total weight of the polyether polyamines.

The polyether polyamine having a mean p value of 6.1 has a content of 1 to 50 wt %, preferably 10 to 50 wt %, and most preferably 10 to 20 wt %, based on the total weight of the polyether polyamines.

The maleate and/or fuumarate preferably comprise one or more of the following groups: dimethyl ester, diethyl ester, dibutyl ester, dipentyl ester, di-2-ethylhexyl ester, substituted by methyl at the 2-position and substituted by methyl at the 3-position.

The dibutyl ester is preferably one or more of the following: di-n-butyl ester, di-sec-butyl ester, and di-tert-butyl ester.

The maleate and/or fuumarate are most preferably one or more of the following: dimethyl maleate, diethyl maleate, dibutyl maleate, dimethyl fumarate, diethyl fumarate, and dibutyl fumarate.

The components for preparing the polyetheraspartic ester (a2) preferably further comprise a polyether polyamine according to the following formula:

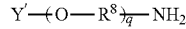

wherein
Y' is one or more of the following: a linear alkyl residue, a branched alkyl residue, and a cycloalkyl residue,
q is an integer of 1 to 35,
$R^8$ is a $C_1$-$C_6$ alkyl residue.

The polyetheraspartic ester (a2) preferably comprises a polyetheraspartic ester according to formula VI:

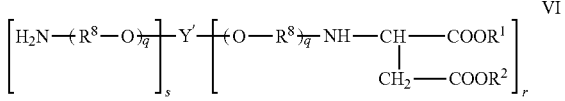

wherein
r is an integer of 2 to 4,
q is an integer of 1 to 35, Y' is an alkyl residue,
$R^1$ and $R^2$ are each independently an organic group that is inert to an isocyanate group at normal pressure and at 100° C. or less,
$R^8$ is a $C_1$-$C_6$ alkyl residue.

The q is preferably an integer of 1 to 8, and most preferably an integer of 1 to 5.

The $R^1$ and $R^2$ are each independently preferably an alkyl residue having 1 to 10 carbon atoms, and most preferably one or more of the following: methyl, ethyl, and butyl.

The Y' is preferably one or more of the following: a linear alkyl residue, a branched alkyl residue, and a cycloalkyl residue; most preferably one or more of the following: ethyl, propyl, butyl, hexyl, cyclohexyl, dicyclohexylmethyl, 3,3'-dimethyldicyclohexylmethyl, 2-methylpentyl, 1,1,1-tri(methyl)propyl and 2,2-bis(methyl)propyl.

The $R^8$ is preferably one or more of the following: methyl, ethyl, and butyl.

The polyetheraspartic ester is most preferably Desmophen NH2850 XP, available from Covestro Germany, Leverkusen, Germany.

Isocyanate Component (b)

The isocyanate groups of the composition of the present invention include free and potentially free isocyanate groups.

Isocyanate prepolymer (b1)

The isocyanate prepolymer has an isocyanate group functionality of preferably 1.9 to 4.5, and most preferably 2.

The isocyanate prepolymer has an isocyanate group content of preferably 1 to 40 wt %, and most preferably 1 to 20 wt %, based on the total weight of the isocyanate prepolymer.

The isocyanate prepolymer preferably has a viscosity of 1000 to 10000 mPa s.

The isocyanate prepolymer is preferably the reaction product of a system comprising an isocyanate monomer and/or an isocyanate oligomer and a polyol.

The reaction for preparing the isocyanate prepolymer has an NCO/OH molar ratio of preferably 1.1:1 to 40:1, and most preferably 2:1 to 25:1.

The excess isocyanate monomers remaining in the reaction for preparing the isocyanate prepolymer can be removed by distillation to obtain a prepolymer without monomer.

The isocyanate monomer preferably has an isocyanate functionality of not less than 2.

The isocyanate monomer is preferably one or more of the following: an aliphatic isocyanate, an aromatic isocyanate, and an alicyclic isocyanate.

The aliphatic isocyanate is preferably one or more of the following: hexamethylene diisocyanate (HDI), 2,2-dimethylpentane diisocyanate, 2,2,4-trimethylhexane diisocyanate, butene diisocyanate, 1,3-butadiene-1,4-diisocyanate, 2,4,4-trimethyl-1,6-hexane diisocyanate, bis(isocyanatoethyl)carbonate, bis(isocyanatoethyl)ether and lysine methyl ester diisocyanate, most preferably hexamethylene diisocyanate.

The alicyclic isocyanate is preferably one or more of the following: isophorone diisocyanate (IPDI), isomeric bis(4,4'-isocyanatocyclohexyl)methane or mixtures thereof having any isomer content, 1,4-cyclohexylene diisocyanate, 1,3-bis(isocyanatomethyl)benzene (XDI), 1,3- and/or 1,4-bis(2-isocyanatoprop-2-yl)-benzene (TMXDI), norbornane diisocyanate (NBDI), hydro-xylylene diisocyanate ($H_6$XDI), 1,4-cyclohexyl diisocyanate ($H_6$PPDI), 1,5-pentane diisocyanate (PDI) and dicyclohexylmethane diisocyanate, most preferably isophorone diisocyanate.

The aromatic isocyanate is preferably toluene diisocyanate (TDI).

The polyol is preferably one or more of the following: a high molecular weight polyol and a low molecular weight polyol; further preferably one or more of the following: a polyether polyol, a polyester polyol, and a polycarbonate polyol; most preferably a polyether polyol and/or a polyester polyol.

The polyol has a molecular weight of preferably more than 300 g/mol, further preferably more than 500 g/mol, and most preferably 500 to 8000 g/mol.

The polyol preferably contains 2 to 6 hydroxyl functional groups, and most preferably 2 to 3 hydroxyl functional groups.

The isocyanate prepolymer preferably comprises one or more of the following groups: a carbamate group and an allophanate group.

Isocyanate Oligomer (b2)

The isocyanate oligomer is preferably obtained by the oligomerization of a system comprising one or more of the following components: 1,4-diisocyanatobutane, 1,5-diisocyanatopentane, 1,6-diisocyanatohexane (HDI), 1,5-diisocyanato-2,2-dimethylpentane, 2,2,4- or 2,4,4-trimethyl-1,6-diisocyanatohexane, 1-isocyano-3,3,5-trimethyl-5-isocyanomethylcyclohexane (IPDI), 1-isocyano-1-methyl-4-(3)-isocyanomethylcyclohexane, bis(4)-isocyanocyclohexylmethane, 2,4- or 4,4-diisocyanatocyclohexylmethane, 1,10-diisocyanatodecane, 1,12-diisocyanatododecane, 1,3- or 1,4-cyclohexane diisocyanate, m-xylylene diisocyanate and isomers thereof, 4-isocyanomethyl-1,8-octane diisocyanate (TIN), 2,4-diisocyanotoluene or 2,6-diisocyanotoluene and 2,2'- or 2,4'- or 4'4'-diphenylmethane diisocyanate.

When the system for preparing the isocyanate oligomer contains 2,6-diisocyanotoluene, the amount of 2,6-diisocyanotoluene is preferably not less than 35 wt %, based on the total weight of the system.

The oligomerization may be carbodiimidation, dimerization, trimerization, biuretization, urealation, urethanization, allophanation or cyclization to form a oxadiazine group. These reactions usually occur simultaneously or continuously.

The isocyanate oligomer preferably comprises one or more of the following groups: iminooxadiazinedione, isocyanurate, uretdione, carbamate, allophanate, biuret, urea, oxadiazinetrione, oxazolidinone, acyl urea and carbodiimide groups; most preferably one or more of the following groups: allophanate, biuret, uretdione, isocyanurate, and iminooxadiazinedione groups.

The isocyanate oligomer containing not less than two isocyanate groups is preferably one or more of the following: an aliphatic triisocyanate, an alicyclic triisocyanate, an araliphatic triisocyanate, an aromatic triisocyanate, and their derivatives having iminooxadiazinedione, isocyanurate, uretdione, carbamate, allophanate, biuret, urea, oxadiazinetrione, oxazolidinone, acyl urea and/or carbodiimide groups, further preferably the derivatives of an aliphatic triisocyanate, an alicyclic triisocyanate, an araliphatic triisocyanate, and an aromatic triisocyanate having allophanate, biuret, uretdione, isocyanurate and/or iminooxadiazinedione groups, more preferably the derivatives of an aliphatic triisocyanate and an alicyclic triisocyanate having allophanate, biuret, uretdione, isocyanurate and/or iminooxadiazinedione groups, and most preferably one or more of the following: Desmodur XP 2580, Desmodur N 3200, Desmodur N 3400, Desmodur N 3600 and Desmodur N 3900.

The isocyanate oligomer has an isocyanate group content of preferably 10 to 50 wt %, and most preferably 20 to 35 wt %, based on the total weight of the isocyanate oligomer.

The isocyanate oligomer preferably has an isocyanate group functionality of 2 to 4.

The isocyanate oligomer preferably has a viscosity of 100 to 4000 mPa s.

The weight ratio of the isocyanate prepolymer to the isocyanate oligomer is preferably from 1:4 to 2:1, and most preferably from 1:2 to 1:1.

The sum of the amounts of the isocyanate-reactive component (a) and the isocyanate component (b) is preferably from 94 to 100 wt %, based on the total weight of the composition.

Catalyst (c)

The catalyst may be a catalyst capable of accelerating the reaction of isocyanate groups with moisture such as water.

The catalyst is preferably one or more of the following: a tertiary amine and a metal salt, most preferably a tertiary amine.

The tertiary amine catalyst is preferably one or more of the following: triethylamine, dimorpholinyl diethyl ether, N,N-dimethylaminocyclohexane, tris-(dimethylaminomethyl)phenol, 1,3,5-tris(dimethylaminopropyl)-hexahydrotriazine, bis(dimethylaminoethyl)ether and 2-[[2-[2-(dimethylamino)ethoxyethyl]methylamino]-ethanol.

The metal salt is preferably one or more of the following: ferric chloride, zinc chloride, bismuth isooctanoate and bismuth carboxylate.

The catalyst has a content of preferably 0.001 to 5 wt %, further preferably 0.01 to 3 wt %, particularly preferably 0.1 to 1.5 wt %, and most preferably 0.15 to 0.35 wt %, based on the total weight of the isocyanate mixture.

Additive (d)

The additive is preferably one or more of the following: a wetting agent, a dispersant, a matting agent, an antifoaming agent, a film former, a thickener, an elastomer, a pigment, a leveling agent, and other additives well-known to those skilled in the art that can be added to the coating composition.

The amount of the additive may be an amount well-known to those skilled in the art that can be added.

The pot life of the coating composition preferably exceeds 40 minutes.

Use

Substrate

The substrate may be artificial stone, wood, artificial wood, marble, terrazzo, ceramic, linoleum, metal, mineral material, plastic, rubber, concrete, composite sheet, paper, leather or glass.

The plastic is preferably polyethylene resin or polypropylene resin.

The substrate may be subject to pretreatment, preferably polishing or coating.

Coating Method

The curing and drying temperature is preferably 25±2° C., and the humidity is preferably 60±10%.

The application may be a method well-known to those skilled in the art, such as knife coating, dip coating, brush coating, roller coating, spray coating or shower coating.

Coated Product

The coated product is preferably a floor.

The coating has a thickness of preferably 60 to 150 m.

The coating may be monolayer or multilayer.

EXAMPLES

All technical and scientific terms used herein have the same meaning as commonly understood by those skilled in the art to which the present invention belongs, unless otherwise defined. When the definition of a term in the present description conflicts with the meaning as commonly understood by those skilled in the art to which the present invention belongs, the definition described herein shall apply.

All numerical values expressing amount of ingredients, reaction conditions and the like which are used in the description and claims are to be understood as being modified by the term "about", unless otherwise specified. Accordingly, unless indicated to the contrary, the numerical values and parameters described herein are approximate values which can be varied according to the desired performance obtained as required.

The grammatical articles "one", "a", "an", and "the", as used in this specification, are intended to include "at least one" or "one or more", unless otherwise specified. By way of example, "a component" means one or more components, and thus, possibly, more than one component is contemplated and may be employed or used in an implementation of the described embodiments.

The term "and/or" used herein refers to one or all of the elements mentioned.

The terms "including" and "comprising" used herein cover both the case that there are only the elements mentioned and the case that there are also other elements unmentioned in addition to the elements mentioned.

All percentages in the present invention refer to weight percentage, unless otherwise specified.

The analysis and measurement in the present invention are carried out at a temperature of 25±2° C. and a humidity of 60±10%, unless otherwise specified.

The number-average molecular weight is determined by gel permeation chromatography using tetrahydrofuran as the mobile phase and control polystyrene standards at 23° C.

The isocyanate group (NCO) content is determined by volume according to DIN-EN ISO 11909, and the measured data includes free and potentially free NCO contents.

The isocyanate functionality is determined according to GPC.

The amino group content is determined according to AFAM 2011-06054.

The viscosity of each component is measured using a Brookfield DV-II+Pro. rotational viscometer according to DIN 53019 at 25±2° C.

$V_{5\ min}$ represents the viscosity of a coating composition after storage for 5 minutes at room temperature. Similarly, $V_{10\ min}$, $V_{15\ min}$, $V_{20\ min}$, $V_{25\ min}$, $V_{30\ min}$, $V_{35\ min}$, $V_{40\ min}$, and $V_{45\ min}$ respectively represents the viscosities of a coating composition after storage at room temperature for 10 minutes, 15 minutes, 20 minutes, 25 minutes, 30 minutes, 35 minutes, 40 minutes, and 45 minutes.

Tack-free time is determined according to GB/T13477.5-2002. "Tack-free" means that when the surface of a coating is touched with a finger, it feels sticky, but no coating gets on the finger. Thus, "tack-free time" refers to the period of time from applying a composition onto a glass surface to the point at which the resulting coating is tack-free.

Pendulum hardness is the hardness of a coating measured using a BYK pendulum hardness tester. Pendulum hardness (1d) refers to the pendulum hardness of a coating after storage for one day, and the pendulum hardness (7d) refers to the pendulum hardness of a coating after storage for seven days.

Pot life is the period of time required for the viscosity of a coating composition to reach 5 times the viscosity after the coating composition is stored for 5 minutes. A longer pot life indicates that the applicable time of the coating composition is longer.

Raw Materials and Reagents

Desmophen NH 1420: having an amino group functionality of 2.0, an amino group equivalent of 279, and a viscosity of 900-2000 mPa s (25° C.), available from Covestro (Germany) Co., Ltd.

Desmophen NH 2850: having an amino group equivalent of 295, and a viscosity of >80 mPa s (25° C.), available from Covestro (Germany) Co., Ltd.

Desmodur N 3600: HDI-based aliphatic trimer, having a solid content of 100 wt %, an NCO equivalent of 183, an NCO content of 23.0 wt %, a HDI monomer content of less than 0.25 wt %, a viscosity of about 1200 mPa s (23° C.), and an NCO functionality of 3.0-3.5, available from Covestro Co., Ltd.

Desmodur N 3900: HDI-based aliphatic trimer, having a solid content of 100 wt %, an NCO content of 23.5 wt %, a HDI monomer content of less than 0.25 wt %, a viscosity of about 730 mPa s (23° C.), and an NCO functionality of 3.0-3.5, available from Covestro Co., Ltd.

Desmodur N 3200: HDI-based aliphatic biuret, having a solid content of 100 wt %, an NCO content of 23 wt %, a HDI monomer content of less than 0.4 wt %, a viscosity of about 2500 mPa s (23° C.), and an NCO functionality of 3.0-3.5, available from Covestro Co., Ltd.

Desmodur XP 2840: HDI-based allophanate, having a solid content of 100 wt %, an NCO content of 23 wt %, a HDI monomer content of less than 0.26 wt %, a viscosity of about 500 mPa s (23° C.), and an NCO functionality of 2.5-3.0, available from Covestro Co., Ltd.

Desmodur VL R 21: MDI-based aromatic trimer, having a solid content of 100 wt %, an NCO content of 31.5 wt %, a viscosity of about 200 mPa s (23° C.), and an NCO functionality of 2.5-3.0, available from Covestro Co., Ltd.

Desmodur E 2863 XP: reaction product of an aliphatic polyester polyol and HDI, having an NCO equivalent of 380, an NCO content of 11.1 wt %, an NCO functionality of about 2.0, a HDI monomer content of less than 0.3 wt %, and a viscosity of about 1350 mPa s (23° C.), available from Covestro Co., Ltd.

Desmodur XP 2617: reaction product of an aliphatic polyether polyol and HDI, having an NCO equivalent of 336, an NCO content of 12.5 wt %, an NCO functionality of about 2.0, a HDI monomer content of less than 0.5 wt %, and a viscosity of about 4250 mPa s (23° C.), available from Covestro Co., Ltd.

Desmodur VP LS 2371: reaction product of an aliphatic polyether polyol and IPDI, having an NCO equivalent of 1100, an NCO content of 3.7 wt %, an NCO functionality of about 2.0, an IPDI monomer content of less than 2 wt %, and a viscosity of about 9800 mPa s (23° C.), available from Covestro Co., Ltd.

Desmodur E 15: reaction product of an aliphatic polyether polyol and TDI, having an NCO equivalent of 950, an NCO content of 4.4 wt %, an NCO functionality of about 2.0, a TDI monomer content of less than 0.5 wt %, and a viscosity of about 7000 mPa s (23° C.), available from Covestro Co., Ltd.

Desmodur E 21: reaction product of an aliphatic polyether polyol and MDI, having an NCO equivalent of 263, an NCO content of 16.0 wt %, an NCO functionality of about 2.0, and a viscosity of about 5400 mPa s (23° C.), available from Covestro Co., Ltd.

Polycat-41: a tertiary amine catalyst having a viscosity of 33 mPa s (25° C.), available from Air Products.

BYK 085: silicone surface additive for solvent-free coatings, available from BYK Additives.

BYK 331: silicone surface additive for solvent-free, solvent-borne and waterborne coatings and printing inks, available from BYK Additives.

PGDA: low-odor solvent, available from Dow Chemical.

BA: volatile solvent, available from Sinopharm Chemical Reagent Co., Ltd.

Reference Values for the Viscosity, Pot Life and Coating Performance Index of a Coating Composition Table 1 shows the reference values for the viscosity, pot life, and coating performance index of a coating composition.

Method for Preparing a Coating Composition

The amounts of the components are shown in Table 2-6. The catalyst was dropwise added to the isocyanate-reactive component, and stirred at normal temperature for 10 to 30 minutes to obtain a mixture A. The isocyanate prepolymer is added to the isocyanate oligomer, and stirred at normal temperature for 10 to 30 minutes to obtain a mixture B. The additive was dropwise added to the mixture A, stirred at normal temperature for 10 to 30 minutes, and allowed to stand for one day; the mixture B was then added thereto, and stirred at normal temperature for 3 to 5 minutes to obtain a coating composition.

Method for Preparing a Coating

The coating composition was applied to the surface of a glass using a 200 m film applicator at an application area of 15 cm*10 cm. A coating was obtained after curing and drying at 27° C. and 68% RH.

Examples 1-2 and Comparative Examples 1-9

Table 2 shows the components of the compositions in Examples 1-2 and Comparative Examples 1-9, as well as the test results of these compositions and their coatings.

TABLE 2

| Components and test results of the compositions in Examples 1-2 (Ex 1-2) and Comparative Examples 1-9 (CE 1-9) | | | | | | | | | | | |
|---|---|---|---|---|---|---|---|---|---|---|---|
| Components/g | CE 1 | CE 2 | CE 3 | CE 4 | CE 5 | CE 6 | CE 7 | CE 8 | CE 9 | Ex 1 | Ex 2 |
| NH 1420 | 45 | 45 | 45 | 45 | 45 | 45 | 45 | 45 | 45 | 45 | 45 |
| BYK 085 | 0.2 | 0.2 | 0.2 | 0.2 | 0.2 | 0.2 | 0.2 | 0.2 | 0.2 | 0.2 | 0.2 |
| BYK 331 | 0.1 | 0.1 | 0.1 | 0.1 | 0.1 | 0.1 | 0.1 | 0.1 | 0.1 | 0.1 | 0.1 |
| Polycat-41 | 0 | 0.15 | 0 | 0.08 | 0.16 | 0.28 | 0 | 0.31 | 0 | 0.19 | 0.13 |
| PGDA | 3.5 | 5.6 | 3.9 | 3.9 | 5.8 | 8.6 | 5 | 9.4 | 0 | 6.5 | 0 |
| BA | 0 | 0 | 0 | 0 | 0 | 0 | 0 | 0 | 4.2 | 0 | 5.2 |
| Desmodur N 3600 | 29.6 | 73.8 | 22.4 | 22.4 | 70 | 13.8 | 0 | 0 | 17.2 | 55.8 | 25.7 |
| Desmodur E 2863 XP | 0 | 0 | 14.9 | 14.9 | 7.8 | 124.2 | 61.5 | 153 | 25.8 | 37.2 | 38.6 |
| NCO/NH (mol %) | 1.00 | 2.50 | 1.00 | 1.00 | 2.50 | 2.49 | 1.00 | 2.50 | 1.00 | 2.50 | 1.50 |
| VOC(g/L) | 49.08 | 49.30 | 49.52 | 49.52 | 49.40 | 49.15 | 49.11 | 49.63 | 49.88 | 49.26 | 49.75 |
| Performance test | | | | | | | | | | | |
| $V_{5min}$/mPa·s | 617.9 | 629.9 | 659.9 | 658.7 | 632.4 | 770.4 | 707.8 | | 767.8 | 659.5 | 775.8 |
| $V_{10min}$/mPa·s | 930.1 | 809.8 | 851.8 | 839.5 | 812.7 | 861.9 | 827.8 | | 923.8 | 757.8 | 878.9 |
| $V_{15min}$/mPa·s | 1338 | 1098 | 1249 | 1198 | 1125 | 973.2 | 995.8 | | 1158 | 943.8 | 1035 |
| $V_{20min}$/mPa·s | 2292 | 1572 | 1854 | 1789 | 1632 | 1125 | 1226 | | 1608 | 1202 | 1281 |
| $V_{25min}$/mPa·s | 4115 | 2292 | 2975 | 2963 | 2295 | 1325 | 1638 | | 2058 | 1588 | 1593 |
| $V_{30min}$/mPa·s | | 3365 | 4889 | 4798 | 3135 | 1563 | 2136 | | 2723 | 1982 | 2141 |
| $V_{35min}$/mPa·s | | 4955 | | | 4299 | 1839 | 2837 | | 3959 | 2517 | 2855 |
| $V_{40min}$/mPa·s | | | | | | 2190 | 3821 | | 5663 | 3263 | 3850 |
| $V_{45min}$/mPa·s | | | | | | 2502 | 5375 | | | 4732 | 5092 |
| Pot life/min | 20-25 | 25-30 | 25-30 | 25-30 | 30-35 | >45 | 35-40 | | 30-35 | 40-45 | 40-45 |
| Tack-free time | <30 min | ≤1 h | <1 h | <1 h | <1 h | 4 h | <50 min | 4 h | 45 min | <2 h | 45 min |
| Pendulum hardness (1 d)/s | 152 | 146 | 118 | 112 | 140 | 30 | 10 | 23 | 66 | 73 | 43 |
| Pendulum hardness (7 d)/s | 153 | 150 | 121 | 131 | 145 | 37 | 10 | 26 | 96 | 74 | 91 |

TABLE 1 reference values for the viscosity, pot life, and coating performance index of a coating composition

| Index | Reference values |
|---|---|
| $V_{5min}$ | <800 mPa·s |
| Pot life | ≥40 min |
| Tack-free time | ≤2 h |
| Pendulum hardness (1 d) | 40-200 s |
| Pendulum hardness (7 d) | 70-200 s |

When comparing Examples 1-2 and Comparative Examples 1-2 and 7-8, it can be seen that the coaling compositions, in which the isocyanate component comprises an isocyanate prepolymer and an isocyanate oligomer, have a long pot life, a short tack-free time and good pendulum hardness.

When comparing Example 1 and Comparative Examples 3-4, it can be seen that the coating composition of the present invention with a molar ratio of isocyanate groups to isocyanate-reactive groups of 2.5 has a much longer pot life than the comparative ones with a molar ratio of isocyanate groups to isocyanate-reactive groups of 1.0.

When comparing Example 2 and Comparative Example 9, it can be seen that the coating composition of the present invention with a molar ratio of isocyanate groups to isocyanate-reactive groups of 1.5 has a much longer pot life than the comparative one with a molar ratio of isocyanate groups to isocyanate-reactive groups of 1.0.

When comparing Example 1 and Comparative Examples 5-6, it can be seen that the coating composition of the present invention with a weight ratio of the isocyanate prepolymer to the isocyanate oligomer in the range of 1:4 to 4:1 is significantly better than the comparative ones with a weight ratio of the isocyanate prepolymer to the isocyanate oligomer in the range of less than 1:4 or more than 4:1 in terms of the pot life, tack-free time and pendulum hardness.

Example 3 and Comparative Examples 10-12

Table 3 shows the components of the compositions in Example 3 and Comparative Examples 10-12, as well as the test results of these compositions and their coatings.

TABLE 3

Components and test results of the compositions in Example 3 (Ex 3) and Comparative Examples 10-12 (CE 10-12)

| Components/g | CE 10 | CE 11 | CE 12 | Ex 3 |
|---|---|---|---|---|
| NH 1420 | 30 | 30 | 30 | 30 |
| NH 2850 | 15 | 15 | 15 | 15 |
| BYK 085 | 0.2 | 0.2 | 0.2 | 0.2 |
| BYK 331 | 0.1 | 0.1 | 0.1 | 0.1 |
| Polycat-41 | 0 | 0.17 | 0 | 0.21 |
| BA | 4.3 | 7.5 | 4.6 | 8 |
| Desmodur N 3200 | 30.5 | 87 | 29.3 | 83.5 |
| Desmodur VP LS 2371 | 0.0 | 0.0 | 7.3 | 20.9 |
| NCO/NH (mol %) | 1.05 | 3.00 | 1.05 | 3.00 |
| VOC (g/L) | 58.96 | 58.82 | 58.37 | 55.63 |
| Performance test | | | | |
| $V_{5min}$/mPa·s | 371.9 | 635.9 | 407.9 | 797.8 |
| $V_{10min}$/mPa·s | 587.9 | 863.8 | 545.9 | 929.8 |
| $V_{15min}$/mPa·s | 1116 | 1250 | 839.8 | 1098 |
| $V_{20min}$/mPa·s | 2334 | 1722 | 1938 | 1435 |
| $V_{25min}$/mPa·s | 5417 | 2397 | 2004 | 1578 |
| $V_{30min}$/mPa·s | | 3119 | 3059 | 2064 |
| $V_{35min}$/mPa·s | | 4019 | 5705 | 2621 |
| $V_{40min}$/mPa·s | | 5401 | | 2531 |
| $V_{45min}$/mPa·s | | | | 3017 |
| $V_{50min}$/mPa·s | | | | 3635 |
| $V_{55min}$/mPa·s | | | | 4175 |
| $V_{60min}$/mPa·s | | | | 4798 |
| $V_{65min}$/mPa·s | | | | 5435 |
| Pot life/min | 15-20 | 25-30 | 20-25 | 50-55 |
| Tack-free time | ≤20 min | ≤1 h | ≤30 min | ≤1.5 h |
| Pendulum hardness (1 d)/s | 127 | 145 | 106 | 119 |
| Pendulum hardness (7 d)/s | 146 | 167 | 127 | 136 |

When comparing Example 3 and Comparative Examples 10-11, it can be seen that the coating composition, in which the isocyanate component comprises an isocyanate prepolymer and an isocyanate oligomer, has a long pot life, a short tack-free time and good pendulum hardness.

When comparing Example 3 and Comparative Example 12, it can be seen that the coating composition of the present invention with a molar ratio of isocyanate groups to isocyanate-reactive groups of 3.0 has a much longer pot life than the comparative one with a molar ratio of isocyanate groups to isocyanate-reactive groups of 1.05.

It can be seen from Example 3 that the coating composition, in which the isocyanate-reactive component comprises a polyaspartic ester (NH1420) and a polyetheraspartic ester (NH2850), has a long pot life, a short tack-free time and good pendulum hardness.

Example 4 and Comparative Examples 13-18 Table 4 shows the components of the compositions in Example 4 and Comparative Examples 13-18, as well as the test results of these compositions and their coatings.

TABLE 4

Components and test results of the compositions in Example 4 (Ex 4) and Comparative Examples 13-18 (CE 13-18)

| Components/g | CE 13 | CE 14 | CE 15 | CE 16 | CE 17 | CE 18 | Ex 4 |
|---|---|---|---|---|---|---|---|
| NH 1420 | 40 | 40 | 40 | 30 | 40 | 40 | 40 |
| NH 2850 | 5 | 5 | 5 | 15 | 5 | 5 | 5 |
| BYK 085 | 0.2 | 0.2 | 0.2 | 0.2 | 0.2 | 0.2 | 0.2 |
| BYK 331 | 0.1 | 0.1 | 0.1 | 0.1 | 0.1 | 0.1 | 0.1 |
| Polycat-41 | 0 | 0.352 | 0 | 0 | 0 | 0.3873 | 0.465 |
| BA | 3.9 | 8.4 | 4.5 | 10 | 4 | 9 | 10.3 |
| Desmodur XP 2840 | 30 | 117.4 | 29 | 0 | 23.1 | 90.4 | 108.5 |
| Desmodur E15 | 0 | 0 | 12.4 | 150 | 0 | 0 | 46.5 |
| Desmodur E21 | 0 | 0 | 0 | 0 | 9.9 | 38.7 | 0 |
| NCO/NH(mol %) | 1.02 | 4.00 | 1.07 | 1.00 | 1.02 | 4.00 | 4.00 |
| VOC(g/L) | 54.11 | 53.83 | 54.17 | 53.40 | 53.40 | 53.80 | 53.61 |
| Performance test | | | | | | | |
| $V_{5min}$/mPa·s | 305.9 | 269.9 | 467.9 | 1554 | 1710 | 1363 | 491.9 |
| $V_{10min}$/mPa·s | 443.9 | 311.9 | 650.1 | 1860 | 3917 | 3143 | 599.9 |
| $V_{15min}$/mPa·s | 809.8 | 455.3 | 1080 | 2214 | 8842 | 6563 | 731.8 |
| $V_{20min}$/mPa·s | 1776 | 567.6 | 1782 | 2633 | | | 881.8 |
| $V_{25min}$/mPa·s | 3161 | 765.1 | 3029 | 3155 | | | 1104 |
| $V_{30min}$/mPa·s | | 1104 | 5092 | 3755 | | | 1399 |
| $V_{35min}$/mPa·s | | 1311 | | 4490 | | | 1692 |
| $V_{40min}$/mPa·s | | 1530 | | 5255 | | | 1974 |

TABLE 4-continued

Components and test results of the compositions in Example 4 (Ex 4) and Comparative Examples 13-18 (CE 13-18)

| Components/g | CE 13 | CE 14 | CE 15 | CE 16 | CE 17 | CE 18 | Ex 4 |
|---|---|---|---|---|---|---|---|
| $V_{45min}$/mPa·s | | 1926 | | 6135 | | | 2214 |
| $V_{50min}$/mPa·s | | 2184 | | 7230 | | | 2579 |
| $V_{55min}$/mPa·s | | | | | | | 2945 |
| $V_{60min}$/mPa·s | | | | | | | 3395 |
| $V_{65min}$/mPa·s | | | | | | | 3869 |
| Pot life/min | 15-20 | 30-35 | 20-25 | 45-50 | 10-15 | 10-15 | 45-50 |
| Tack-free time | ≤20 min | ≤1.5 h | <30 min | ≤2 h | | | ≤2 h |
| Pendulum hardness (1 d)/s | 152 | 130 | 111 | 2 | | | 107 |
| Pendulum hardness (7 d)/s | 160 | 173 | 143 | 3 | | | 134 |

When comparing Example 4 and Comparative Examples 13-14 and 16, it can be seen that the coating composition, in which the isocyanate component comprises an isocyanate prepolymer and an isocyanate oligomer, has a long pot life, a short tack-free time and good pendulum hardness.

When comparing Example 4 and Comparative Examples 15 and 17, it can be seen that the coating composition of the present invention with a molar ratio of isocyanate groups to isocyanate-reactive groups of 4.0 has a much longer pot life than the comparative ones with a molar ratio of isocyanate groups to isocyanate-reactive groups of 1.07 and 1.02.

When comparing Example 4 and Comparative Example 18, the comparative composition, in which the isocyanate prepolymer has an isocyanate group equivalent of less than 300, has a much shorter pot life than the coating composition of the present invention.

It can be seen from Example 4 that the coating composition, in which the isocyanate-reactive component comprises a polyaspartic ester (NH1420) and a polyetheraspartic ester (NH2850), has a long pot life, a short tack-free time and good pendulum hardness.

Comparative Examples 19-20

Table 5 shows the components of the compositions in Comparative Examples 19-20, as well as the test results of these compositions and their coatings.

TABLE 5

Components and test results of the compositions in Comparative Examples 19-20 (CE 19-20)

| Components/g | CE 19 | CE 20 |
|---|---|---|
| NH 1420 | 30 | 30 |
| NH 2850 | 15 | 15 |
| BYK 085 | 0.2 | 0.2 |
| BYK 331 | 0.1 | 0.1 |
| Polycat-41(0.2%) | 0 | 0.161 |
| BA | 4.3 | 7.5 |
| Desmodur VL R21 | 19.4 | 48.4 |
| Desmodur VP LS 2371 | 12.9 | 32.3 |
| NCO/NH (mol %) | 1.00 | 2.50 |
| VOC (g/L) | 57.64 | 57.74 |
| Performance test | | |
| Gelation of the composition within five minutes | | |
| $V_{5min}$/mPa·s | >10000 | >10000 |
| Pot life | <5 min | <5 min |
| Tack-free time | <5 min | <5 min |
| Pendulum hardness (1 d) | not manually applicable due to a too short pot life | |
| Pendulum hardness (7 d) | | |

As can be seen from Comparative Examples 19-20, when the isocyanate oligomer of the isocyanate component is obtained by the reaction of an aromatic isocyanate, the coating compositions comprising the same cannot be manually applied due to a short pot life, and the coatings formed by such coating compositions have a short tack-free time.

Example 5 and Comparative Examples 21-24

Table 6 shows the components of the compositions in Example 5 and Comparative Examples 21-24, as well as the test results of these compositions and their coatings.

TABLE 6

Components and test results of the compositions in Example 5 (Ex 5) and Comparative Examples 21-24 (CE 21-24)

| Components/g | CE 21 | CE 22 | CE 23 | CE 24 | Ex 5 |
|---|---|---|---|---|---|
| NH 1420 | 45 | 45 | 45 | 45 | 45 |
| NH 2850 | 0 | 0 | 0 | 0 | 0 |
| BYK 085 | 0.2 | 0.2 | 0.2 | 0.2 | 0.2 |
| BYK 331 | 0.1 | 0.1 | 0.1 | 0.1 | 0.1 |
| Polycat-41 | 0 | 0.14 | 0 | 0.08 | 0.19 |
| MPA | 3.5 | 5.4 | 3.9 | 3.9 | 6.4 |
| Desmodur N | 30.4 | 72.3 | 19.7 | 19.7 | 47 |

TABLE 6-continued

Components and test results of the compositions in Example 5 (Ex 5) and Comparative Examples 21-24 (CE 21-24)

| Components/g | CE 21 | CE 22 | CE 23 | CE 24 | Ex 5 |
|---|---|---|---|---|---|
| 3900 | | | | | |
| Desmodur XP 2617 | 0 | 0 | 19.7 | 19.7 | 47.0 |
| NCO/NH (mol %) | 1.05 | 2.50 | 1.05 | 1.05 | 2.50 |
| VOC (g/L) | 48.58 | 48.20 | 48.37 | 48.37 | 48.21 |
| Performance test | | | | | |
| $V_{5min}$/mPa · s | 527.9 | 515.9 | 749.8 | 738.5 | 759.8 |
| $V_{10min}$/mPa · s | 665.9 | 617.9 | 881.8 | 876.9 | 821.8 |
| $V_{15min}$/mPa · s | 953.8 | 791.2 | 1152 | 1115 | 965.8 |
| $V_{20min}$/mPa · s | 1524 | 1122 | 1560 | 1509 | 1166 |
| $V_{25min}$/mPa · s | 2681 | 1578 | 2657 | 1598 | 1476 |
| $V_{30min}$/mPa · s | 4775 | 2369 | 2993 | 2899 | 1810 |
| $V_{35min}$/mPa · s | | 3250 | 4493 | 4278 | 2302 |
| $V_{40min}$/mPa · s | | | | | 2813 |
| $V_{45min}$/mPa · s | | | | | 3321 |
| $V_{50min}$/mPa · s | | | | | 4817 |
| Pot life/min | 20-25 min | 25-30 min | 30-35 min | 30-35 min | 45-50 min |
| Tack-free time | ≤25 min | ≤50 min | ≤35 min | ≤35 min | ≤1 h |
| Pendulum hardness (1 d)/s | 124 | 114 | 110 | 108 | 67 |
| Pendulum hardness (7 d)/s | 143 | 150 | 139 | 124 | 91 |

When comparing Example 5 and Comparative Examples 21-22, it can be seen that the coating composition, in which the isocyanate component comprises an isocyanate prepolymer and an isocyanate oligomer, has a long pot life, a short tack-free time and good pendulum hardness.

When comparing Example 5 and Comparative Examples 23-24, it can be seen that the coating composition of the present invention with a molar ratio of isocyanate groups to isocyanate-reactive groups of 2.5 has a much longer pot life than the comparative ones with a molar ratio of isocyanate groups to isocyanate-reactive groups of 1.05

It is apparent to those skilled in the art that the present invention is not limited to the specific details described above, and may be embodied in other specific forms without departing from the spirit or essential characteristics of the present invention. The Examples are to be considered in all respects as illustrative but not restrictive, so that the scope of the present invention is defined by the claims rather than the foregoing description. Thus, any change, as long as it belongs to the meaning and range of equivalents of the claims, should be considered as part of this invention.

The invention claimed is:

1. A coating composition comprising:
   (a) an isocyanate-reactive component comprising:
      (a1) at least one polyaspartic ester, and
      (a2) optionally a polyetheraspartic ester;
   (b) an isocyanate component comprising:
      (b1) at least one isocyanate prepolymer having an isocyanate group equivalent of 300 to 1100, and
      (b2) at least one isocyanate oligomer containing not less than two isocyanate groups,
   a weight ratio of the isocyanate prepolymer (b1) to the isocyanate oligomer (b2) being from 1:4 to 4:1;
   (c) a catalyst, wherein the catalyst is one or more of the following: a tertiary amine, ferric chloride, zinc chloride, bismuth isooctanoate or bismuth carboxylate; and
   (d) optionally an additive;
   wherein the coating composition has a molar ratio of isocyanate groups to isocyanate-reactive groups of 1.5:1 to 8:1.

2. The composition according to claim 1, wherein the polyaspartic ester (a1) comprises a polyaspartic ester according to formula I:

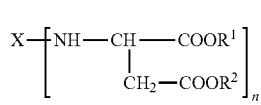

wherein

X represents an aliphatic residue, $R^1$ and $R^2$ are each independently an organic group that is inert to an isocyanate group at ambient pressure and at 100° C. or less, and n is an integer of not less than 2.

3. The composition according to claim 2, wherein the aliphatic residue of the polyaspartic ester (a1) is one or more of the following: a linear alkyl residue, a branched alkyl residue, or a cycloalkyl residue.

4. The composition according to claim 1, wherein the polyaspartic ester (a1) has a content of more than 50 wt %, based on a total weight of the isocyanate-reactive component (a).

5. The composition according to claim 2, wherein n is 2 and the polyaspartic ester (a1) is prepared by a reaction comprising a polyamine of the following formula and a maleate and/or a fumarate of the following formula:

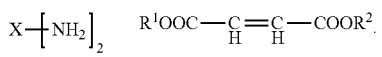

6. The composition according to claim 2, wherein the polyaspartic ester (a1) comprises one or more of the following polyaspartic esters:

(i) a polyaspartic ester having the structure of formula II,

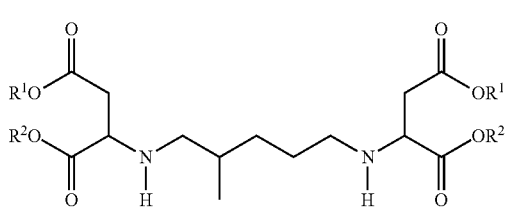

(ii) a polyaspartic ester having the structure of formula III, or

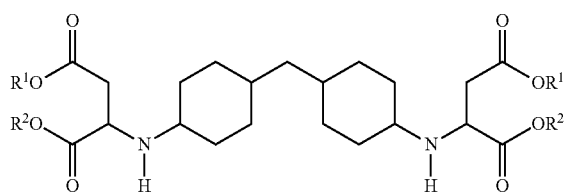

(iii) a polyaspartic ester having the structure of formula IV,

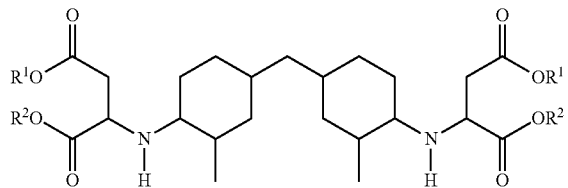

wherein R1 and R2 are each independently one or more of the following: methyl, ethyl or butyl.

7. The composition according to claim 1, wherein the polyetheraspartic ester (a2) comprises a polyetheraspartic ester according to formula V:

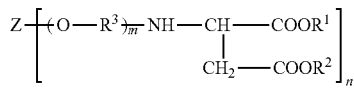

wherein
Z represents an aliphatic residue,
$R^1$ and $R^2$ are each independently an organic group that is inert to an isocyanate group at ambient pressure and at 100° C. or less,
$R^3$ represents a $C_1$-$C_6$ alkyl residue,
n is an integer of not less than 2, and
m is an integer of 1 to 5.

8. The composition according to claim 7, wherein the aliphatic residue of the polyetheraspartic ester (a2) is one or more of the following: a linear alkyl residue, a branched alkyl residue, or a cycloalkyl residue.

9. The composition according to claim 1, wherein the polyetheraspartic ester (a2) is prepared by a reaction comprising a polyether polyamine of the following formula and a maleate and/or a fumarate of the following formula:

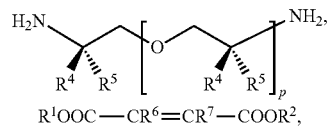

$R^1OOC-CR^6=CR^7-COOR^2$, wherein
p is an integer of not less than 2,
$R^1$ and $R^2$ are each independently an organic group that is inert to an isocyanate group at ambient pressure and at 100° C. or less,
$R^4$ and $R^5$ are each independently one or more of the following: hydrogen or a $C_1$-$C_4$ alkyl residue,
$R^6$ and $R^7$ are each independently one or more of the following: hydrogen or an organic group inert to an isocyanate group.

10. The composition according to claim 9, wherein the components for preparing the polyetheraspartic ester (a2) further comprise a polyether polyamine according to the following formula:

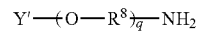

wherein
Y' is one or more of the following: a linear alkyl residue, a branched alkyl residue, or a cycloalkyl residue,
q is an integer of 1 to 35,
$R^8$ is a $C_1$-$C_6$ alkyl residue.

11. The composition according to claim 1, wherein the polyetheraspartic ester (a2) comprises a polyetheraspartic ester according to formula VI:

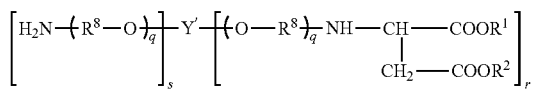

wherein
r is an integer of 2 to 4,
q is an integer of 1 to 35,
Y' is an alkyl residue,
$R^1$ and $R^2$ are each independently an organic group that is inert to an isocyanate group at ambient pressure and at 100° C. or less,
$R^8$ is a $C_1$-$C_6$ alkyl residue.

12. The composition according to claim 1, wherein the isocyanate prepolymer (b1) comprises one or more of the following groups: a carbamate group or an allophanate group.

13. The composition according to claim 1, wherein the isocyanate prepolymer (b1) has an isocyanate group content of 1 to 40 wt %, based on a total weight of the isocyanate prepolymer.

14. The composition according to claim 1, wherein the isocyanate oligomer (b2) comprises one or more of the following groups: an allophanate group, a biuret group, an uretdione group, an isocyanurate group, or an iminooxadiazinedione group.

15. The composition according to claim 1, wherein the isocyanate oligomer (b2) is one or more of the following: derivatives of an aliphatic triisocyanate or an alicyclic triisocyanate having one or more of allophanate, biuret, uretdione, isocyanurate, or iminooxadiazinedione groups.

16. The composition according to claim 1, wherein the isocyanate oligomer (b2) has an isocyanate group content of 10 to 50 wt %, based on a total weight of the isocyanate oligomer.

17. A method of protecting a substrate surface or a coating thereof, comprising applying the coating composition of claim 1 to a substrate surface or the coating thereof, followed by curing and/or drying.

18. A coating method comprising applying the coating composition of claim 1 to a substrate surface, followed by curing and/or drying.

19. A coated product comprising a substrate and a coating formed by applying the coating composition of claim 1 to the substrate and then curing and/or drying.

20. The coated product according to claim 19, wherein the coated product is a floor.

* * * * *